(12) United States Patent
Miller et al.

(10) Patent No.: US 11,182,076 B2
(45) Date of Patent: Nov. 23, 2021

(54) MANAGING UNEQUAL NETWORK SHARED DISKS (NSD) IN A COMPUTER NETWORK

(71) Applicant: INTERNATIONAL BUSINESS MACHINES CORPORATION, Armonk, NY (US)

(72) Inventors: Vernon W. Miller, Tucson, AZ (US); Richard A. Welp, Manchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 15/259,364

(22) Filed: Sep. 8, 2016

(65) Prior Publication Data

US 2018/0067663 A1 Mar. 8, 2018

(51) Int. Cl.
*G06F 3/06* (2006.01)

(52) U.S. Cl.
CPC ............ *G06F 3/0605* (2013.01); *G06F 3/067* (2013.01); *G06F 3/0631* (2013.01); *G06F 3/061* (2013.01); *G06F 3/0604* (2013.01); *G06F 3/0644* (2013.01); *G06F 3/0665* (2013.01); *G06F 3/0683* (2013.01); *G06F 3/0689* (2013.01); *G06F 2206/1012* (2013.01); *G06F 2211/1023* (2013.01)

(58) Field of Classification Search
CPC .................. G06F 3/0665; G06F 3/0689; G06F 2211/1023; G06F 3/0604; G06F 3/061; G06F 3/0631; G06F 3/0644; G06F 3/0683; G06F 2206/1012

See application file for complete search history.

(56) References Cited

U.S. PATENT DOCUMENTS

| 7,539,838 | B1 | 5/2009 | Todd et al. | |
|---|---|---|---|---|
| 7,660,966 | B2 | 2/2010 | Strange et al. | |
| 7,827,286 | B1 * | 11/2010 | Deflaux | G06F 17/302 |
| | | | | 711/170 |
| 7,913,038 | B2 | 3/2011 | Sicola | |
| 3,051,243 | A1 | 11/2011 | Murase | |
| 3,200,935 | A1 | 6/2012 | Noguchi et al. | |
| 8,688,909 | B2 * | 4/2014 | Ishizaki | G06F 3/0607 |
| | | | | 711/114 |
| 8,935,493 | B1 | 1/2015 | Dolan et al. | |
| 9,641,615 | B1 * | 5/2017 | Robins | G06F 11/1088 |
| 2004/0078542 | A1 | 4/2004 | Fuller et al. | |
| 2006/0117132 | A1 * | 6/2006 | Gray | H04L 67/1097 |
| | | | | 711/100 |
| 2009/0271485 | A1 * | 10/2009 | Sawyer | G06F 3/061 |
| | | | | 709/206 |
| 2009/0276588 | A1 * | 11/2009 | Murase | G06F 3/0608 |
| | | | | 711/160 |
| 2012/0072662 | A1 * | 3/2012 | Jess | G06F 12/0653 |
| | | | | 711/114 |
| 2015/0169232 | A1 * | 6/2015 | Klemm | G06F 11/1076 |
| | | | | 711/114 |

* cited by examiner

*Primary Examiner* — Masud K Khan
(74) *Attorney, Agent, or Firm* — Griffiths & Seaton PLLC (57) ABSTRACT

Embodiments for managing unequal workloads between Network Shared Disks (NSD) in a networked computing environment by a processor. Additional space may be carved out from at least one of a plurality of NSDs in a cluster file system, upon detecting an unbalanced load between the plurality of NSDs, while maintaining a predetermined level of usage according to a performance profile of the plurality of NSDs.

20 Claims, 5 Drawing Sheets

MANAGING UNEQUAL NETWORK SHARED DISKS (NSD) IN A COMPUTER NETWORK

BACKGROUND OF THE INVENTION

Field of the Invention

The present invention relates in general to computing systems, and more particularly to, various embodiments for managing unequal workloads between Logical Unit Numbers (LUNs)/Network Shared Disks (NSD) in a networked computing environment using a computing processor.

Description of the Related Art

Computing systems may be found in the workplace, at home, or at school. Computer systems may include data storage systems, or disk storage systems, to process and store data. A storage system may include one or more disk drives, which may be configured in an array, such as a Redundant Array of Independent Disks (RAID) topology. In a RAID system, data is stored redundantly across multiple disks in a variety of configurations to provide data security in the event of a hardware or software failure.

As the technology field grows exponentially each year and ever-growing amounts of critical data are stored on storage systems such as RAIDs, the need to preserve and protect such data becomes increasingly paramount. Consequently, the need for advancement in the data storage field is of great precedence.

SUMMARY OF THE INVENTION

Various embodiments for managing unequal workloads between Logical Unit Numbers (LUNs)/Network Shared Disks (NSD) in a networked computing environment by a processor, are provided. In one embodiment, by way of example only, a method for managing unequal workloads between LUNs/NSDs in a networked computing environment, again by a processor, is provided. Additional space may be carved out from at least one of a plurality of NSDs in a cluster file system, upon detecting an unbalanced load between the plurality of NSDs, while maintaining a predetermined level of the plurality of NSDs usage according to a performance profile of the plurality of NSDs.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

A computer storage system may include computing clusters that may include multiple systems that interact with each other to provide client systems with data, applications, and other system resources as a single entity. Computing cluster may include a file system to manage data storage within the computing cluster. One type of cluster may include a Parallel File Systems (PFS), which provides a scalable and parallel access to backend storage consisting of a storage network, such as, for example, a storage-area-network (SAN). For example, the PFS may allow up to two nodes to be designated as Network Storage Disk (NSD) servers for any given LUN/NSD (Logical Unit Number/Network Storage Disk). If a single NSD server is defined, it may be designated as the primary NSD server. If two servers are defined, the first server in the list may be designated as the primary NSD server and the other server is designated as the backup NSD server. The primary NSD server may be responsible for performing input-output (I/O) and associated data transfer over a designated (global) PFS network to any PFS client that does not have local access to the NSD. By default, the data transfer from an active NSD server to any NSD client may take place over the global PFS network used to define the PFS cluster.

Moreover, storage networks, such as a SAN, are network architectures used to connect servers (also referred to herein as "host systems") to storage systems such as disk arrays, tape libraries, and the like. A storage network may include a logical unit number (LUN) which may be an entire physical disk, or a subset of a larger physical disk or disk volume. The physical disk or disk volume may be an entire single disk drive, a partition (subset) of a single disk drive, or a disk volume from a redundant array of independent disks (RAID) controller comprising multiple disk drives aggregated together for larger capacity and redundancy. In one aspect, a LUN may assist in managing block storage arrays shared over a SAN. In an additional aspect, a LUN may represent a logical abstraction, or rather, a virtualization layer between a physical disk device/volume and one or more applications.

In one aspect, backend storage hardware may be added and configured into one or more LUNs. The LUNs may be presented to a filesystem management application and can be added to new or existing filesystems. One or more new LUNs may be added to an existing filesystem and the data and metadata on the filesystem may be restriped across all of the LUNs in the filesystem. The LUNs may be logical devices presenting block level access to RAID arrays, and the data protection and mirroring of the underlying RAID devices may be similar for all LUNs of a particular usage type in the filesystem. However, a current challenge is that newer storage hardware may either be only available with higher capacity media, and/or it may be more cost effective to purchase higher capacity media. Even though a data protection scheme (e.g., RAID, mirroring, internal replication, etc.) may be the same as the existing LUNs, the usable capacity of newer storage hardware may have increased data protection.

It should be noted that one or more users may create LUNs that are striped across multiple RAID arrays or storage devices and can be arbitrary in size. This may allow for equally sized LUNs to be presented to a clustered filesystem, such as, for example a SAN volume controller. This however does not always address equal load balancing across the backend storage and a current need exists that addresses the challenges encountered with large scale clustered filesystems, which may span multiple underlying storage subsystems that might be purchased separately over the course of several years or more.

For example, an initial deployment of a clustered filesystem may consist of a "building block" of storage from a particular vendor. Assume a building block consists of 120 hard disk drives (HDDs) configured in a 12 RAID 6 8+P+Q arrays, and at the time of the initial deployment each HDD is 4 terabyte (TB) in capacity. A clustered filesystem may be created using 12 RAID-6 LUNs as storage for the filesystem data and metadata. Assume, for purposes of the example, that over the course of a few years the filesystem reaches a significant level of utilization (e.g., at or near maximum utilization capacity) and a system administrator desires to add another building block from the same vendor. Assume, however, the storage vendor no longer offers 4 TB HDDs, but only offers 6 TB HDDs, which is then purchased by the system administrator. The system administrator desires to add the 12 new RAID-6 LUNs to the existing filesystem. The administrator has two choices. First, the 12 new RAID-6 LUNs can be added to the filesystem and the data and metadata of the filesystem are restriped across all 24 LUNs, which causes the 6 TB based LUNs to eventually become a performance bottleneck. Second, the new 12 new RAID-6 LUNs may be added as a separate pool and have policies determine when data is written to the 4 TB based LUNs, and when it is written or migrated to the 6 TB based LUNs. In the first case (choice one) data access is unbalanced and leads to a performance bottleneck. In the second case (choice two) data placement policies and management become more complex.

Accordingly, the mechanisms of the present invention provide a solution for the challenges describe above at the clustered filesystem level such that they may apply to any vendor or implementation of backend block storage. In one aspect, these mechanisms manage one or more LUNs (e.g., NSDs) in a common usage group where a total size of the NSDs may be unbalanced (e.g., there are mismatched predetermined level of usages amongst one or more NSDs). In one aspect, mismatched NSD capacities may be determined and a new managed tier of storage with additional capacity may be created. The mechanisms of the present invention may present the new tier of storage to a user and a user may decide how to utilize the additional space. In one aspect, these mechanisms ensure that the original tier of storage will maintain its previous performance profile, and may determine the appropriate level of performance for the new tier such that it does not affect the original tier's performance.

In a similar fashion, various embodiments are provided for managing unequal workloads between LUNs/NSDs in a networked computing environment by a processor. In one embodiment, by way of example only, a method for managing unequal workloads between LUNs/NSDs, again by a processor, is provided. Additional space may be carved out and/or selected from at least one of a plurality of NSDs in a cluster file system, upon detecting an unbalanced load between the plurality of NSDs, while maintaining a predetermined level of usage according to a performance profile of the plurality of NSDs. The usage of a plurality of Redundant Array of Independent Disks (RAID) devices, which may be of a plurality of different sizes, that are in association with the plurality of NSDs may be managed such that managing the usage maintains a total capacity of the plurality of RAID devices while increasing performance. For example, the present invention may manage a plurality of Redundant Array of Independent Disks (RAID) devices that are in association with the plurality of NSDs by splitting the at least one of the plurality of NSDs into a first portion equal to the predetermined level of usage and a second portion equal to an additional predetermined level of usage to maintain a total capacity and performance of the plurality of RAID devices.

In one aspect, the mechanisms of the present invention manage unequal NSDs in a networked computing environment including managing NSDs in a common usage group in such cases where a total size of the NSDs are not balanced, detecting when NSD capacities are mismatched and creating a new managed tier of storage with the additional capacity. These mechanisms may present and/or provide access to a new tier of storage to the user and the user can decide how to utilize the space based on user defined policies. Additionally, these mechanisms maintain the original storage's tier previous performance profile, and will determine the appropriate level of performance for the new tier of storage such that it does not affect the original tier's performance. That is, the present invention manages RAID devices of different sizes to allow for effective use of the RAID devices while not impacting performance or loss of total capacity. The new NSDs may also be solid-state drives (SSD) and additional speed capability can be leveraged in the performance policy.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
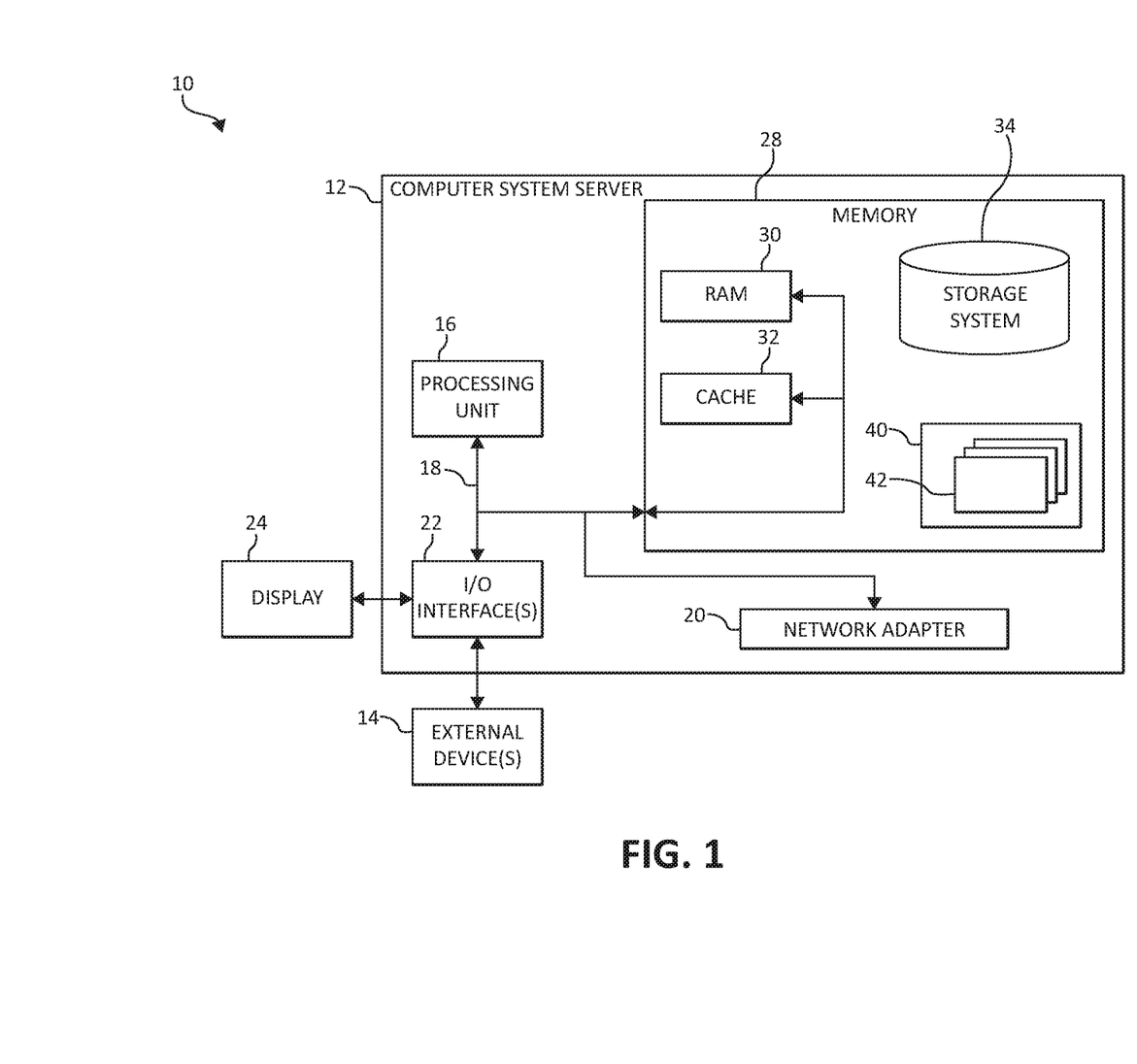
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
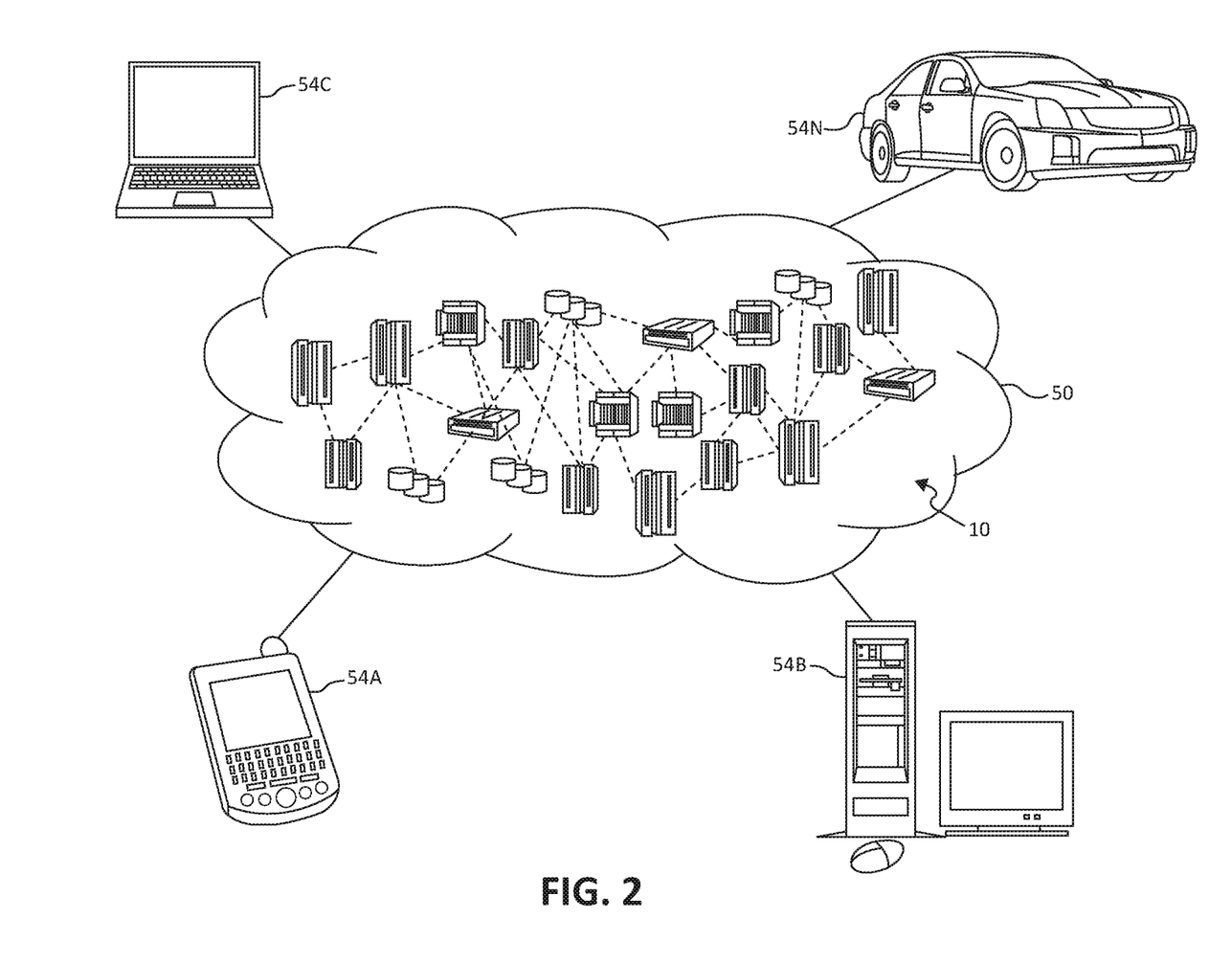
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
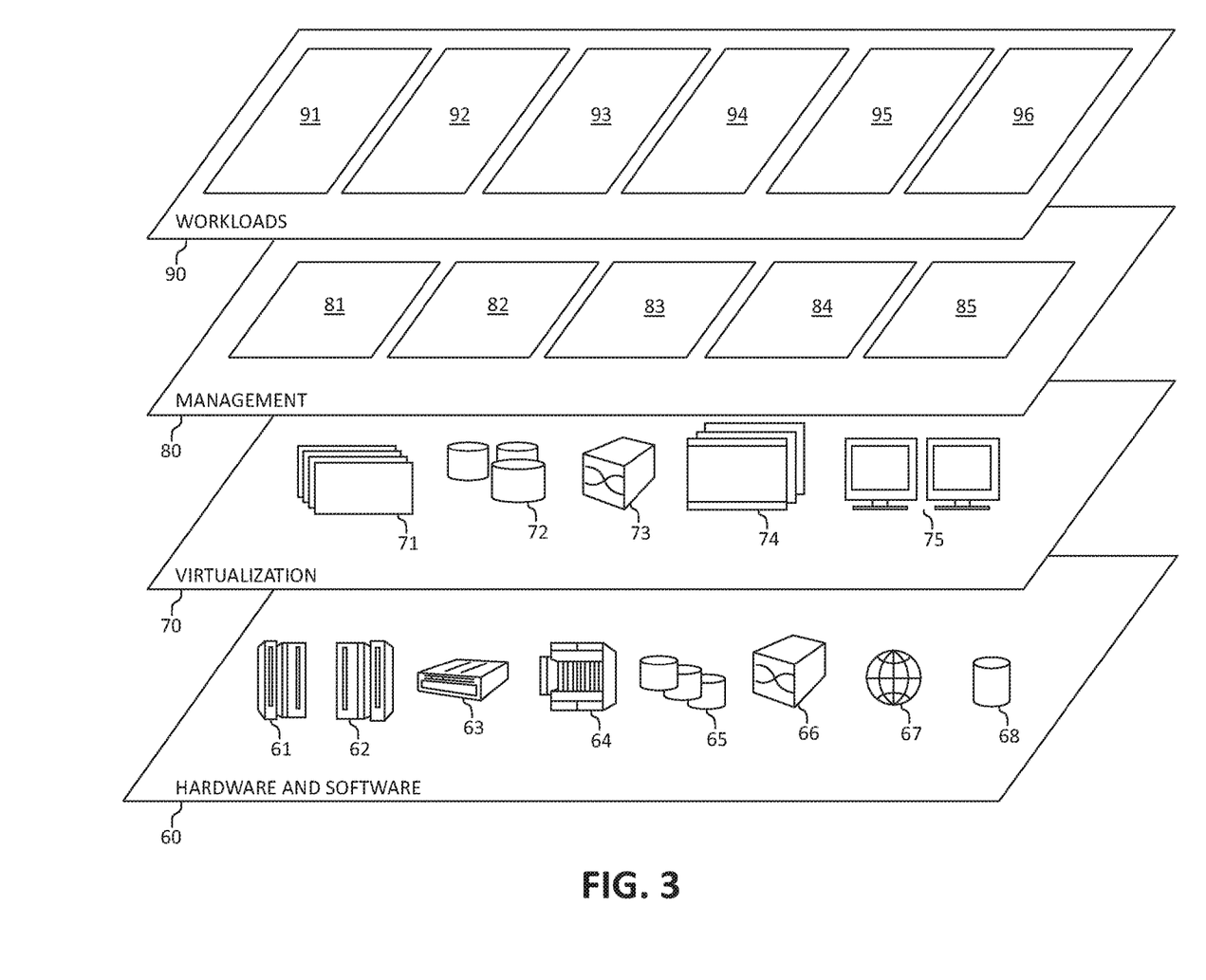
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various managing unequal workloads between LUNs/NSDs workloads and functions 96. In addition, managing unequal workloads between LUNs/NSDs workloads and functions 96 may include such operations as performance workload analytics, performance profile analysis, managing LUNs in a cluster, and as will be further described, LUN space management functions. One of ordinary skill in the art will appreciate that the managing unequal workloads between LUNs/NSDs workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the improvement of managing unequal workloads between LUNs/NSDs in a networked computing environment by, among other aspects, carving out additional space from at least one of a plurality of NSDs in a cluster file system, upon detecting an unbalanced load between the plurality of NSDs, while maintaining a predetermined level of usage according to a performance profile of the plurality of NSDs.

Figure 4:
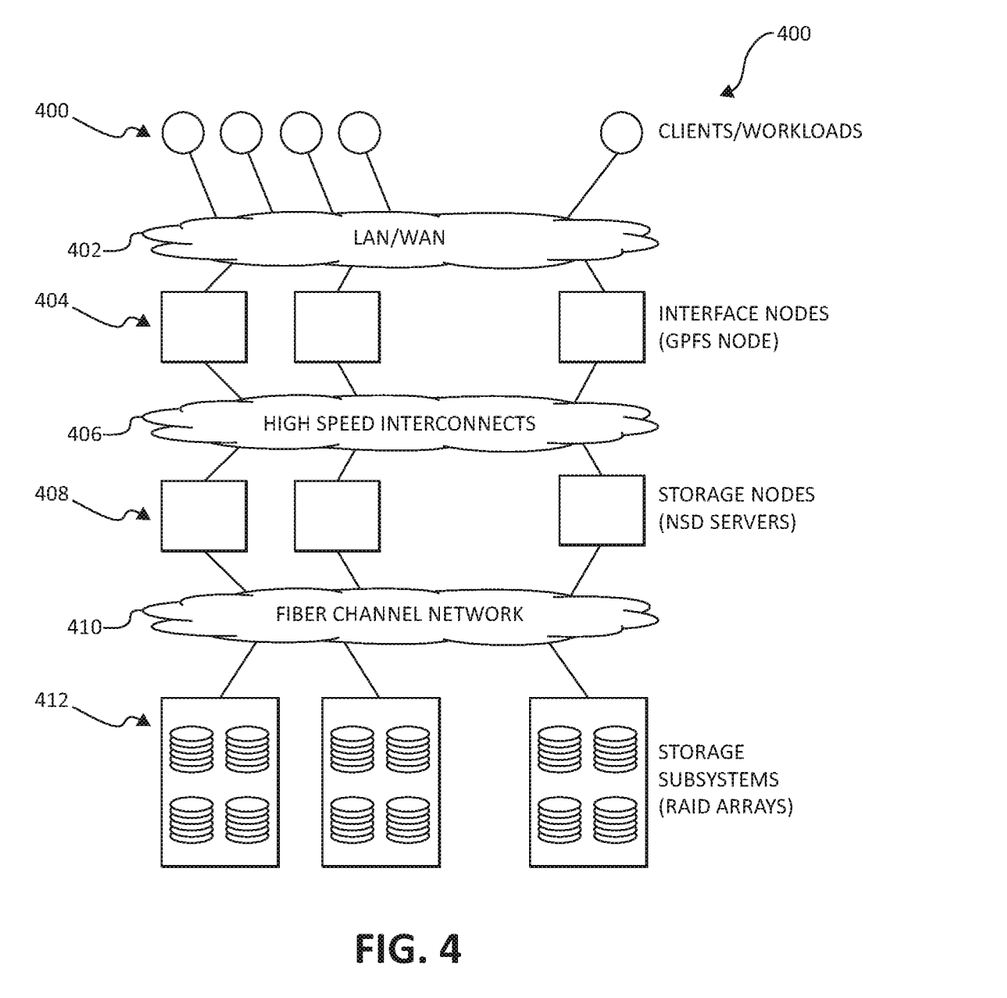
FIG. 4 is an architectural diagram in accordance with aspects of the present invention.

Turning now to FIG. 4, an illustrative architecture 400 according to an embodiment of the present invention is shown. As shown, a set (at least one) of clients 400 can communicate with a set of interface nodes 404 (e.g., PFS nodes) over a network connection 402 (e.g., LAN, WAN, etc.). A set of interface nodes 404 may communicate via interconnects 406 (e.g., high speed interconnects) with a set of storage nodes 408. As further shown, the set of storage nodes 408 may interface with a set of storage subsystems 412, which may be one or more LUNs/NSDs (e.g., Redundant Array of Independent Disks (RAID)) via fiber channel network 410. The storage subsystem 412 (e.g., one or more LUNs) may include one or more disks (hardware or software RAID) that may be presented as one logical entity by storage hardware and/or operating systems. As discussed above, the embodiments of the present invention provide managing unequal workloads between LUNs/NSDs for storage architectures such as that shown in FIG. 4. Among other things, such embodiments may carve out additional space from at least one of a plurality of NSDs in a cluster file system, upon detecting an unbalanced load between the plurality of NSDs, while maintaining a predetermined level of usage according to a performance profile of the plurality of NSDs.

Figure 5:
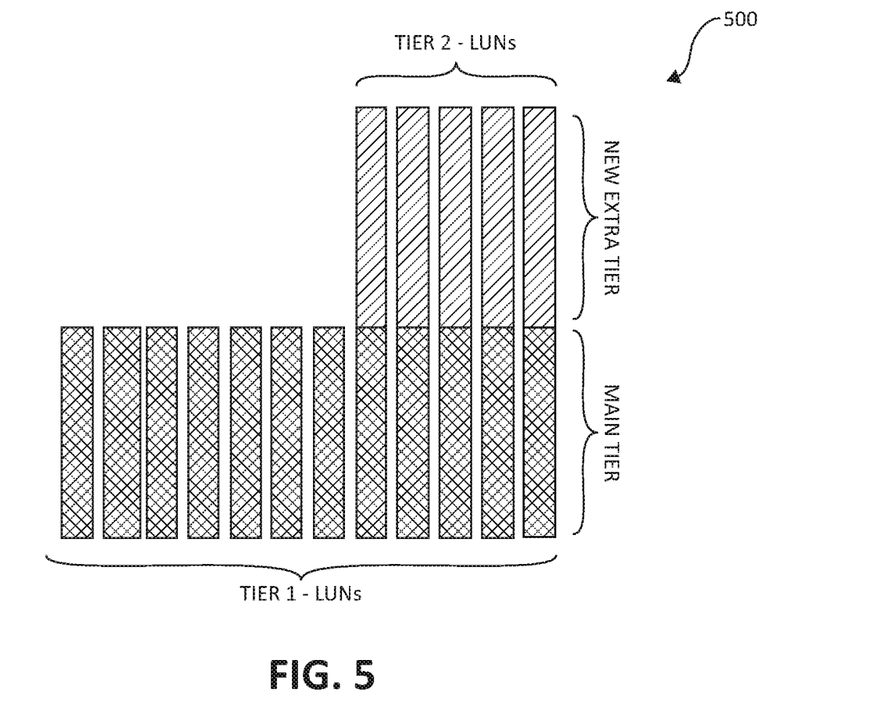
FIG. 5 is an additional block diagram depicting managing unequal workloads between Logical Unit Numbers (LUNs)/Network Shared Disks (NSD) in a networked computing environment according to an embodiment of the present invention.

Turning now to FIG. 5, depicting a block diagram 500 for managing unequal workloads between LUNs/NSDs in a networked computing environment according to various aspects of the present invention. In one aspect, one or more of the components, modules, services, applications, and/or functions described in FIGS. 1-4 may be used in FIG. 5. As shown, descriptive information is seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for managing unequal workloads between LUNs/NSDs in accordance with the present invention. Many of the functional blocks 500 may execute as background processes on various components, either in distributed computing components, or on the user device, or elsewhere.

In one aspect, the described embodiments may provide a balance between the two choices faced by the system administrator, as discussed above. As depicted in FIG. 5, a filesystem application may detect the capacity mismatch between the two sets of LUNs (e.g., NSDs, such as those described in FIG. 4 may be using more storage capacity than other NSDs), and automatically split new LUNs into two tiers, such as tier one (e.g., the 'main tier' or "Tier 1") and the second tier or "Tier 2" (e.g., additional data space in a new extra tier). Tier 1 (e.g., the main tier) may include one or more LUNs and have a same capacity as the original LUNs (prior to the split). Tier 1 LUNs may be designed and/or used for primary data and metadata placement. The remaining capacity of LUNs may be available and provided in Tier 2 as another tier (e.g., the new extra tier) to be used either by a filesystem application or by the user.

Returning now to the example relating to the two choices faced by the system administrator as referenced above, when the new LUNs are added to the existing filesystem, the 4 TB storage drives of each 6 TB HDD may be utilized for the main tier ("Tier 1"), and 2 TB for the extra tier ("Tier 2"). The data and metadata for the filesystem may be restriped across all 24 LUNs (e.g., the 12 4 TB based LUNs and the main tier of the 6 TB based LUNs). Because the number of allocated blocks for the filesystem on the main tier (e.g., Tier 1) may be equal among the HDDs, any possibility that one or more of the new drives becoming a bottleneck is eliminated. In fact, for workloads for which a number of drives become a bottleneck, the maximum performance of the system may be improved by 100%. However, the extra tier (Tier 2) can also still be used, if needed. For example, the capacity of LUNs in Tier 2 may be used as a secondary tier to which rarely accessed files or least recently used files are migrated during off-peak hours. The Tier 2 LUN space may be used as a repository for filesystem snapshots, or as temporary scratch space for applications.

It should be noted that the example of the two choices faced by the system administrator as illustrated herein, is only one example and the 4 TB compared to the 6 TB drives is a common scenario where newer storage is added and is 1.5-2.0× (e.g., 1.5 to 2.0 times) larger in capacity than what currently resides in the system. By way of example only, a specific implementation where the mechanisms of the present invention may be applied is in the IBM® Spectrum Scale for use in allocating filesystem blocks across NSDs.

Figure 6:
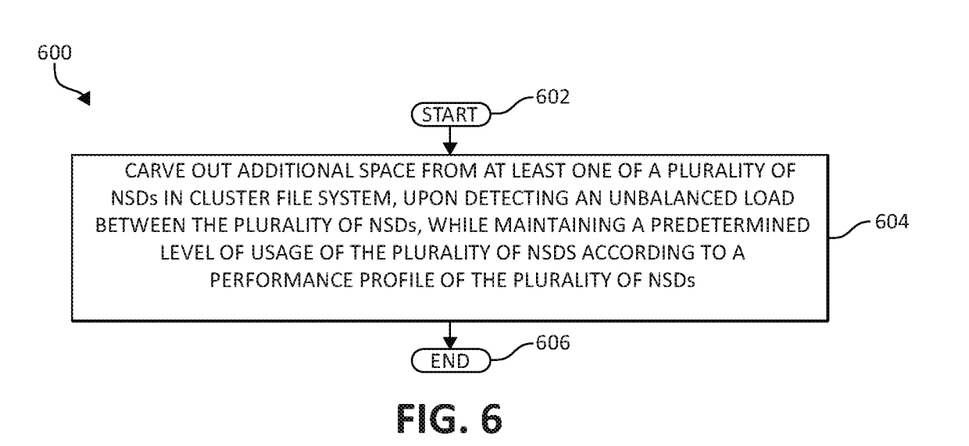
FIG. 6 is an additional flowchart diagram depicting an additional exemplary method for managing unequal workloads between Logical Unit Numbers (LUNs)/Network Shared Disks (NSD) in a networked computing environment by a processor, again in which aspects of the present invention may be realized.

Turning now to FIG. 6, a method 600 for managing unequal workloads between LUNs/NSDs in a networked computing environment by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. Starting in block 602, additional space is carved out from at least one of a plurality of NSDs in a cluster file system, upon detecting an unbalanced load between the plurality of NSDs, while maintaining a predetermined level of usage according to a performance profile of the plurality of NSDs (block 604). The method 600 ends (block 606). It should be noted that as used herein, LUN and NSD may be used interchangeably. That is, an NSD may be a LUN and a LUN may be an NSD.

In one aspect, in conjunction with and/or as part of at least one block of FIG. 6, the operations of method 600 may include each of the following. The operations of method 600 may determine a performance level of the additional space to enable the plurality of NSDs to operate at predetermined level of usage according to the performance profile, and/or use the plurality of NSDs for primary data storage and metadata placement and using the additional space for at least one of secondary data storage, least used data, migrated data from alternative storage systems, a repository for snapshots of the cluster file system, or a temporary scratch space.

In one aspect, the carving out the additional space further includes comparing a performance level of each one of the LUNs to identify those of the plurality of LUNs performing below the performance profile. For example, the additional space may be carved out or chosen from those of the plurality of LUNs performing below the performance profile. The carving out the additional space further includes identifying a performance capacity mismatch between two sets of the plurality of NSDs. The operations of method 600 may split two sets of NSDs into a first storage tier and a second storage tier, wherein the first storage tier includes the plurality of NSDs operating at the predetermined level of usage of the performance profile and the second storage tier includes the additional space operating at an additional predetermined level of usage. The operations of method 600 may, upon adding additional NSDs to the cluster file system, assign a first portion of the additional NSDs to the first storage tier equal to the predetermined level of usage and a second portion of the additional NSDs to the second storage tier equal to the additional predetermined level of usage.

In an additional aspect, the operations of method 600 may manage a plurality of RAID devices of different sizes, which are in association with the plurality of NSDs, in order to maintain a total predetermined usage level of the plurality of RAID devices by splitting the at least one of the plurality of NSDs into a first portion equal to the predetermined level of usage and a second portion equal to an additional level of usage. Upon adding additional NSDs to a plurality of Redundant Array of Independent Disks (RAID) devices, maintaining a total predetermined level of usage of the plurality of RAID devices by assigning a first portion of the additional NSDs to a first storage tier equal to the predetermined level of usage and a second portion of the additional NSDs to a second storage tier equal to the additional level of usage. In this way, the present invention provides improvement over the current state of the art because the mechanisms of the embodiments manage RAID devices of different sizes to allow for effective use of the RAIDs while not impacting performance or loss of total capacity (e.g., total storage capacity and usage).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for managing unequal workloads between Network Shared Disks (NSD) in a networked computing environment, comprising:
   at a first time, maintaining a first plurality of NSDs, each comprising a physical storage drive having a matching first total capacity, in a computing cluster that together form a cluster file system, wherein the first plurality of NSDs operate according to a performance profile of a first level of performance with respect to a type of drive and a read/write speed associated with the type of drive, and wherein the first plurality of NSDs aggregately comprise a first storage tier of a first storage size presented to the cluster file system in which primary data of the cluster file system is stored;
   at a second time subsequent the first time and responsive to adding a second plurality of NSDs, each comprising the physical storage drive having a matching second total capacity higher than the matching first total capacity, to the computing cluster, incorporating only a capacity equal to the matching first total capacity of each added NSD to the first storage tier to increase the first storage size of the first storage tier, wherein, upon incorporating the storage capacity, a remaining capacity comprising a mismatched difference between the matching first total capacity and the matching second total capacity of each added NSD exists for each of the second plurality of NSDs, and wherein a predetermined level of usage according to the performance profile is maintained for the first storage tier subsequent to adding the second plurality of NSDs;
   using the remaining capacity of each of the second plurality of NSDs to automatically create a second storage tier presented to the cluster file system, the second storage tier having a second storage size less than the first storage size of the first storage tier and consisting of only the mismatched difference in capacity between the first plurality of NSDs and the second plurality of NSDs, wherein the second storage tier operates at an additional level of usage having a second level of performance, with respect to the type of drive and the read/write speed associated with the type of drive, commensurate with the performance profile capable by a lowest performing NSD of the second plurality of NSDs, and wherein any of the NSDs in the second storage tier operating at a performance level above the lowest performing NSD are throttled to the second level of performance capable by the lowest performing NSD to match each of the second plurality of NSDs to an equal level of performance; and
   responsive to automatically creating the second storage tier, restriping the primary data of the cluster file system across the first plurality of NSDs and the second plurality of NSDs corresponding to only the first storage tier while isolating, from the restriping, those portions of the second plurality of NSDs of the second storage tier.

2. The method of claim 1, further including using the first storage tier for primary data storage and metadata placement and using the second storage tier for at least one of secondary data storage, least used data, migrated data from alternative storage systems, a repository for snapshots of the cluster file system, or a temporary scratch space.

3. The method of claim 1, further including determining a current level of usage of the second storage tier to enable the first plurality of NSDs and the second plurality of NSDs to operate at the predetermined level of usage according to the performance profile.

4. The method of claim 1, further including identifying a performance level of usage mismatch between the first plurality of NSDs and the second plurality of NSDs.

5. The method of claim 1, further including upon adding additional NSDs to the cluster file system, assigning a first portion of the additional NSDs to the first storage tier equal to the predetermined level of usage and a second portion of the additional NSDs to the second storage tier equal to the additional level of usage.

6. The method of claim 1, further including managing a plurality of Redundant Array of Independent Disks (RAID) devices having a plurality of sizes, which are in association with the first plurality of NSDs and the second plurality of NSDs, in order to maintain a total predetermined usage level of the plurality of RAID devices by splitting the at least one of the first plurality of NSDs and the second plurality of NSDs into a first portion equal to the predetermined level of usage and a second portion equal to the additional level of usage.

7. The method of claim 1, further including, upon adding additional NSDs to a plurality of Redundant Array of Independent Disks (RAID) devices, maintaining a total predetermined level of usage of the plurality of RAID devices by assigning a first portion of the additional NSDs to the first storage tier equal to the predetermined level of usage and a second portion of the additional NSDs to the second storage tier equal to the additional level of usage.

8. A system for managing unequal workloads between Network Shared Disks (NSD) in a computing environment, comprising:
   one or more computers with executable instructions that when executed cause the system to:
      at a first time, maintain a first plurality of NSDs, each comprising a physical storage drive having a matching first total capacity, in a computing cluster that together form a cluster file system, wherein the first plurality of NSDs operate according to a performance profile of a first level of performance with respect to a type of drive and a read/write speed associated with the type of drive, and wherein the first plurality of NSDs aggregately comprise a first storage tier of a first storage size presented to the cluster file system in which primary data of the cluster file system is stored;
      at a second time subsequent the first time and responsive to adding a second plurality of NSDs, each comprising the physical storage drive having a matching second total capacity higher than the matching first total capacity, to the computing cluster, incorporate only a capacity equal to the matching first total capacity of each added NSD to the first storage tier to increase the first storage size of the first storage tier, wherein, upon incorporating the storage capacity, a remaining capacity comprising a mismatched difference between the matching first total capacity and the matching second total capacity of each added NSD exists for each of the second plurality of NSDs, and wherein a predetermined level of usage according to the performance profile is maintained for the first storage tier subsequent to adding the second plurality of NSDs;

use the remaining capacity of each of the second plurality of NSDs to automatically create a second storage tier presented to the cluster file system, the second storage tier having a second storage size less than the first storage size of the first storage tier and consisting of only the mismatched difference in capacity between the first plurality of NSDs and the second plurality of NSDs, wherein the second storage tier operates at an additional level of usage having a second level of performance, with respect to the type of drive and the read/write speed associated with the type of drive, commensurate with the performance profile capable by a lowest performing NSD of the second plurality of NSDs, and wherein any of the NSDs in the second storage tier operating at a performance level above the lowest performing NSD are throttled to the second level of performance capable by the lowest performing NSD to match each of the second plurality of NSDs to an equal level of performance; and responsive to automatically creating the second storage tier, restripe the primary data of the cluster file system across the first plurality of NSDs and the second plurality of NSDs corresponding to only the first storage tier while isolating, from the restriping, those portions of the second plurality of NSDs of the second storage tier.

9. The system of claim 8, wherein the executable instructions use the first storage tier for primary data storage and metadata placement and using the second storage tier for at least one of secondary data storage, least used data, migrated data from alternative storage systems, a repository for snapshots of the cluster file system, or a temporary scratch space.

10. The system of claim 8, wherein the executable instructions determine a current level of usage of the second storage tier to enable the first plurality of NSDs and the second plurality of NSDs to operate at the predetermined level of usage according to the performance profile.

11. The system of claim 8, wherein the executable instructions identify a performance level of usage mismatch between the first plurality of NSDs and the second plurality of NSDs.

12. The system of claim 8, further including upon adding additional NSDs to the cluster file system, assigning a first portion of the additional NSDs to the first storage tier equal to the predetermined level of usage and a second portion of the additional NSDs to the second storage tier equal to the additional level of usage.

13. The system of claim 8, wherein the executable instructions manage a plurality of Redundant Array of Independent Disks (RAID) devices having a plurality of sizes, which are in association with the first plurality of NSDs and the second plurality of NSDs, in order to maintain a total predetermined usage level of the plurality of RAID devices by splitting the at least one of the first plurality of NSDs and the second plurality of NSDs into a first portion equal to the predetermined level of usage and a second portion equal to the additional level of usage.

14. The system of claim 8, wherein the executable instructions, upon adding additional NSDs to a plurality of Redundant Array of Independent Disks (RAID) devices, maintain a total predetermined level of usage of the plurality of RAID devices by assigning a first portion of the additional NSDs to the first storage tier equal to the predetermined level of usage and a second portion of the additional NSDs to the second storage tier equal to the additional level of usage.

15. A computer program product for, by a processor, managing unequal workloads between Network Shared Disks (NSD) in a computing environment, the computer program product comprising a non-transitory computer-readable storage medium having computer-readable program code portions stored therein, the computer-readable program code portions comprising:

an executable portion that, at a first time, maintains a first plurality of NSDs, each comprising a physical storage drive having a matching first total capacity, in a computing cluster that together form a cluster file system, wherein the first plurality of NSDs operate according to a performance profile of a first level of performance with respect to a type of drive and a read/write speed associated with the type of drive, and wherein the first plurality of NSDs aggregately comprise a first storage tier of a first storage size presented to the cluster file system in which primary data of the cluster file system is stored;

an executable portion that, at a second time subsequent the first time and responsive to adding a second plurality of NSDs, each comprising the physical storage drive having a matching second total capacity higher than the matching first total capacity, to the computing cluster, incorporates only a capacity equal to the matching first total capacity of each added NSD to the first storage tier to increase the first storage size of the first storage tier, wherein, upon incorporating the storage capacity, a remaining capacity comprising a mismatched difference between the matching first total capacity and the matching second total capacity of each added NSD exists for each of the second plurality of NSDs, and wherein a predetermined level of usage according to the performance profile is maintained for the first storage tier subsequent to adding the second plurality of NSDs;

an executable portion that uses the remaining capacity of each of the second plurality of NSDs to automatically create a second storage tier presented to the cluster file system, the second storage tier having a second storage size less than the first storage size of the first storage tier and consisting of only the mismatched difference in capacity between the first plurality of NSDs and the second plurality of NSDs, wherein the second storage tier operates at an additional level of usage having a second level of performance, with respect to the type of drive and the read/write speed associated with the type of drive, commensurate with the performance profile capable by a lowest performing NSD of the second plurality of NSDs, and wherein any of the NSDs in the second storage tier operating at a performance level above the lowest performing NSD are throttled to the second level of performance capable by the lowest performing NSD to match each of the second plurality of NSDs to an equal level of performance; and an executable portion that, responsive to automatically creating the second storage tier, restripes the primary data of the cluster file system across the first plurality of NSDs and the second plurality of NSDs corresponding to only the first storage tier while isolating, from the restriping, those portions of the second plurality of NSDs of the second storage tier.

16. The computer program product of claim 15, further including an executable portion that uses the first storage tier for primary data storage and metadata placement and using the second storage tier for at least one of secondary data storage, least used data, migrated data from alternative storage systems, a repository for snapshots of the cluster file system, or a temporary scratch space.

17. The computer program product of claim 15, further including an executable portion that determines a current level of usage of the second storage tier to enable the first plurality of NSDs and the second plurality of NSDs to operate at the predetermined level of usage according to the performance profile.

18. The computer program product of claim 15, further including an executable portion that identifies a performance level of usage mismatch between the first plurality of NSDs and the second plurality of NSDs.

19. The computer program product of claim 15, further including an executable portion that upon adding additional NSDs to the cluster file system, assigns a first portion of the additional NSDs to the first storage tier equal to the predetermined level of usage and a second portion of the additional NSDs to the second storage tier equal to the additional level of usage.

20. The computer program product of claim 15, further including an executable portion that:
 manages a plurality of Redundant Array of Independent Disks (RAID) devices having a plurality of sizes, which are in association with the first plurality of NSDs and the second plurality of NSDs, in order to maintain a total predetermined usage level of the plurality of RAID devices by splitting the at least one of the first plurality of NSDs and the second plurality of NSDs into a first portion equal to the predetermined level of usage and a second portion equal to the additional level of usage; or
 upon adding additional NSDs to the plurality of RAID devices, maintain the total predetermined level of usage of the plurality of RAID devices by assigning the first portion of the additional NSDs to the first storage tier equal to the predetermined level of usage and the second portion of the additional NSDs to the second storage tier equal to the additional level of usage.

* * * * *